United States Patent [19]

Lemke et al.

[11] Patent Number: 5,097,368

[45] Date of Patent: Mar. 17, 1992

[54] INFORMATION RECORDING APPARATUS WITH A NON-NEWTONIAN LIQUID BEARING

[75] Inventors: James U. Lemke, San Diego; William W. French, Encinitas, both of Calif.

[73] Assignee: Conner Peripherals, Inc., San Jose, Calif.

[21] Appl. No.: 453,312

[22] Filed: Dec. 20, 1989

Related U.S. Application Data

[63] Continuation-in-part of Ser. No. 259,344, Oct. 17, 1988, abandoned.

[51] Int. Cl.$^5$ .............................................. G11B 5/60
[52] U.S. Cl. .................................... 360/97.02; 360/103
[58] Field of Search ..................... 360/97.02, 102–104

[56] References Cited

U.S. PATENT DOCUMENTS

| | | | |
|---|---|---|---|
| 3,177,493 | 4/1965 | Durlofsky | 346/74 |
| 3,907,079 | 9/1975 | Chapman | 188/290 |
| 4,366,519 | 12/1982 | Maruyama | 360/129 |
| 4,626,941 | 12/1986 | Sawada et al. | 360/97 |
| 4,757,402 | 7/1988 | Mo | 360/103 |
| 4,789,913 | 12/1988 | Gregory et al. | 360/97.03 |
| 4,901,185 | 2/1990 | Kubo et al. | 360/104 |
| 4,931,338 | 6/1990 | Toffle | 428/65 |

FOREIGN PATENT DOCUMENTS

| | | |
|---|---|---|
| 57-40753 | 3/1982 | Japan . |
| 63-136384 | 6/1988 | Japan . |
| 63-136384 | 6/1988 | Japan . |

OTHER PUBLICATIONS

Tribology and Mechanics of Magnetic Storage Systems (pp. 98–104) by Timsit, Strattford & Fairlie, 1987.
Lubricants For Magnetic Recording Media, IBM Technical Disclosure Bulletin, Dec. 1986, Friedman & Marchese.
I Brake For Whales by Whyte Audio, Jul. 1990.
InfoCorp Publication (9/30/88).
Here Comes The First 2.5-In. Winchester Drive, Oct. 1988, Electronics article.
A New 2½ Inch Thin Film Disk (Oct. 1988), Solid State Technology article.
3½-Inch High-Performance Winchester Disk Drives For Laptop Computers, Conner Peripherals article.
Magnetic Recording article, vol. II, C. D. Mee et al., copyright 1988.
Translation of Document No. 57-40753–Japan.
Translation of Document No. 63-136384–Japan.

*Primary Examiner*—John H. Wolff
*Attorney, Agent, or Firm*—Fliesler, Dubb, Meyer & Lovejoy

[57] ABSTRACT

An information storage apparatus is disclosed for reading and/or writing information on a rigid disk, which includes a non-Newtonian liquid bearing interface between a transducer and a storage medium, instead of a conventional air or Newtonian liquid bearing. The non-Newtonian liquid has a composition which exhibits plastic or pseudoplastic flow at high rates of shear. Preferably, the liquid is of the class of compounds whose viscosity shows a negative dependence on shear rate. Thus, as the relative speed of the transducer and the storage medium increases, while their relative spacing decreases, the increasing shear rate to which the liquid bearing is subjected causes the viscosity of the liquid to reduce. Resultantly, very low flying heights can be achieved, which increases the potential storage density on the storage medium, while the reduced drag exerted on the transducer by the lowered viscosity greatly reduces the power required to rotate the medium.

19 Claims, 4 Drawing Sheets

INFORMATION RECORDING APPARATUS WITH A NON-NEWTONIAN LIQUID BEARING

RELATED CO-PENDING PATENT APPLICATIONS

This application is a continuation-in-part of U.S. patent application Ser. No. 259,344, filed Oct. 17, 1988, for "Information Recording Apparatus with a Liquid Bearing" now abandoned.

The following co-pending patent application includes subject matter relevant to this application:

U.S. patent application Ser. No. 07/314,999, filed Feb. 24, 1989, for "Wet Rigid Disk Drive Assembly with a Conical Spindle Bearing" now abandoned.

BACKGROUND OF THE INVENTION

1. Field of the Invention

The present invention relates to information recording systems. More specifically, the present invention relates to a recording system having a novel liquid bearing interface between a transducer and a storage medium that provides improved reliability and performance over the currently-used air bearing. The invention applies particularly to information recording systems which use a disk for information storage and an air- or oil-borne transducer head for placing information on, and retrieving information from, the disk.

2. Background of the Art

The tribology of magnetic recording systems presents challenges well-known in the art. Although continual contact between the transducer (typically a read/write head mounted on a slider) and the magnetic medium is advantageous from a magnetic perspective, such arrangement is undesirable because wear and materials interactions lead to degraded system reliability and performance. Accordingly, one paramount consideration in designing magnetic recording systems is the maintenance of spacing between the head and medium.

The read/write head in a conventional recording system does not touch the rigid magnetic disk during sustained normal operation. Instead, it "flies" at a certain height (the "flying height") on a thin cushion of air carried along by the rapidly spinning disk. Typical flying heights are on the order of 12 microinches above the disk's surface.

The function of this cushion of air is analogous to that of a bearing, in that it corresponds to a machine part on which another part (the head) moves or slides with respect to the disk. In this regard, the air cushion supports the head in its position off of the disk.

Of course, a number of recording technologies do permit physical contact between head and storage medium during operation. Such technologies typically employ a flexible storage medium and are represented by tape and floppy disk recording systems. In these technologies, the concept and requirements of "flying height", and considerations relating to a bearing which functions to maintain flying height, are absent. This invention is not intended for use in such systems. Instead, this invention finds its dominant use in recording technologies in which a rigid, recording medium is moved (usually, rotated) with respect to a transducer, which must be maintained at a position off of ("above") the moving medium during system operation.

In the description following, the moving medium is assumed to be a rigid, rotating magnetic disk, usually referred to as a "hard" or "Winchester" disk. However, the description of the embodiment is not intended to limit the scope of application of the invention, which could also apply, for example, to a spinning drum or, to a head in motion with respect to a stationary medium.

The disks in typical rigid-disk recording systems are commonly, but not always, coated with a relatively thin layer of lubricant, typically tens of Angstroms thick, to protect the head and disk surfaces during those occasional times when these surfaces touch, such as when the drive is jarred, or when the head passes over an asperity on the disk, or during take off and landing of the head. As is well known in the art, such lubrication is achieved by topical application.

These lubricating layers are always made with very viscous lubricants coated thinly onto the disk surfaces. This is done because less viscous lubricants would soon migrate to the edge of the disk due to centrifugal forces generated by the spinning disk and the lubricant layer would become so thin that it could no longer function effectively. Furthermore, less viscous lubricants would tend to have higher vapor pressures and tend to evaporate and further deplete the surface. If the lubricant is made thicker, then the head will be spaced further from the medium, which will degrade the performance of the system as is well known in the art.

There are several problems associated with conventional air bearings. First; air is relatively compressible. A small acceleration (as small as 40 g's) can exert a force on a head in a typical system great enough to cause the head to strike the disk, which, in spite of the presence of a lubricant, can lead to complete failure of the system. Such accelerations are easily caused by shocks and vibrations commonly encountered in the environment in which magnetic recording systems are employed. Second; when the distance from the head to the disk becomes comparable to the mean free path of air molecules, about three microinches, the air bearing becomes unstable and unreliable. As modern systems begin to approach this spacing limit, these instabilities in flying height can cause catastrophic contact between head and disk, and make it difficult for the system designer to know what record current to use when recording and what signal level to expect when reading information from the disk.

Present recording systems based upon use of a rigid disk experience the above-described shortcomings. Storage of information at even higher densities will require lower flying heights and smoother disks. Increased emphasis must, therefore, be placed on provision of a stable bearing operating between the head and the storage medium which supports the head over the medium at a distance which is smaller than that achievable by the air bearing of the prior art, yet which is mechanically simple and cost effective.

The prior art teaches the use of oil as a bearing material which can replace air. For example, Lynott's U.S. Pat. No. 2,969,435 describes an oil film spacer between a recording head and a rotating magnetic disk. In U.S. Pat. No. 3,005,675 of Ledin, et al., oil is used to form a fluid bearing between a magnetic head and a rotating drum having a magnetic recording surface. In Gabor's U.S. Pat. No. 3,579,212, a head and a storage medium are immersed in a Newtonian fluid while a related storage medium moves with respect to the head. The fluids used in these patents are Newtonian fluids which exhibit a constant viscosity. Furthermore, these references discuss head-surface spacings which are above even the spacing achievable with an air bearing. Because the described fluids are Newtonian, these prior art recording devices are relatively inefficient. This is because at very small head-surface spacings, a high speed induces very high shear rates between the fluid and the head. As the shear rate increases, the drag force on the head increases commensurately, since the fluids are Newtonian. As the drag force increases, more power is required to rotate the disk.

In U.S. Pat. No. 4,633,351 of Bardos, et al., a hydrodynamic magnetic recording process is described in which a recording surface is moved relative to a recording head separated from the surface by a liquid of the type that will evaporate without leaving a residue. In this patent, all of the fluids proposed as evaporatible liquid bearings are Newtonian liquids, such as water, alcohol, and acetone.

In the magnetic recording arts, miniaturization of components is proceeding apace. Reduction of rigid disk standard size from 5-¼" to 3-½" will put a premium on techniques which increase the storage density of the smaller disks. Of course, one extremely effective way of increasing storage density is to decrease the flying height of the recording head. However, reduction of the flying height raises the risks in air bearing mechanisms of head-disk contact. In mechanisms which use Newtonian fluid bearings, reduction of the head-surface spacing results in a significant increase in power required to rotate the disk. In portable systems, this translates to reduction of battery lifetime or to increase in the size and count of power elements.

SUMMARY OF THE INVENTION

In view of the above deficiencies of the art, it is an object of the present invention to provide an information storage system with a novel non-Newtonian liquid bearing which supports a transducer over a relatively-moving storage medium. This object, and other purposes and advantages of the present invention are realized in an information storage system comprising a rigid information storage medium, a transducer for interacting with the information storage medium, a means for applying a force on the transducer directed toward the storage medium, and a non-Newtonian liquid bearing acting between the transducer and the storage medium to support the transducer upon the storage medium during relative movement between the transducer and the storage medium.

In this invention, the non-Newtonian liquid bearing acting between the transducer and the storage medium includes a liquid whose viscosity decreases with an increase in the shear rate to which the liquid is subjected by relative movement between the transducer and the storage medium. Such a liquid is in the class of non-Newtonian liquids described as "plastic" or "pseudoplastic".

The unique non-Newtonian liquid bearing of this invention provides manifold advantages. The plastic or pseudoplastic liquid of which the bearing consists exhibits a viscosity which decreases with an increase in the shear rate between the medium and the transducer, which is related directly to the relative velocity and indirectly to the spacing between the transducer and the storage medium. Reduction of the viscosity of pseudoplastic liquids at higher shear rates means that for any given speed, head geometry and geometrical relationship to the disk, the drag will be greater for a Newtonian liquid than for a pseudoplastic liquid if they have the same viscosity at low shear rates. In addition, use of a liquid bearing enhances the stability of the transducer with respect to the moving storage medium at high speeds and very low head-to-disk spacings. This, of course, increases the potential density of information storage on the medium and the speed with which the information can be retrieved.

BRIEF DESCRIPTION OF THE DRAWINGS

The novel features of the present invention may be better understood from the accompanying description when read in conjunction with the accompanying drawings, in which like characters refer to like parts and, in which.

DETAILED DESCRIPTION OF THE PREFERRED EMBODIMENTS

In this description, the terms "transducer" and "head", are synonymous, as are "disk", "rigid disk", and "storage medium".

Liquid Bearing

The present invention provides a non-Newtonian liquid bearing acting between the rigid disk and head components of a head-disk assembly (HDA) used in information recording systems of the Winchester type.

Figure 1:
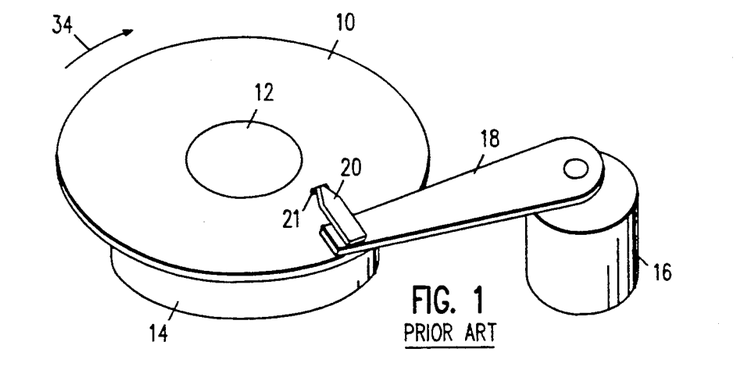
FIG. 1 illustrates a simplified diagram of a typical prior art arrangement of a head-disk assembly.
Figure 2:
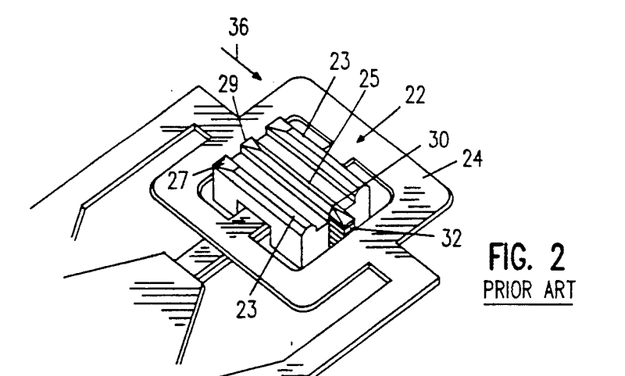
FIG. 2 illustrates an enlarged view of the underside of a typical prior art head which utilizes an air bearing interface between the head and disk.

In the prior art, illustrated in FIGS. 1 and 2, the interface between a rigid disk medium 10 and a transducer 21 is maintained in an assembly including a means for rotating the disk 10, the means including a spindle 12 which fits through a central circular hole in the middle of the disk 10, and a spindle rotator 14. The transducer 21 is normally loaded by application of a pressure or force applied to the transducer 21 and directed toward the disk 10. The force is applied by an assembly including an actuator 16, a swing arm 18, and a gimballed spring suspension mechanism 20. The actuator pivots the swing arm 18 to selectively position the transducer radially with respect to the disk 10. The gimballed spring suspension mechanism 20 loads the transducer 21 against the disk 10 when the disk is stationary. When the disk rotates, an air bearing is generated which counterloads the transducer 21, lifting and maintaining it above the surface of the disk to a distance referred to as the flying height. The spacing between the transducer 21 and the surface of the disk 10 is generally determined by the amount of loading exerted on the transducer 21, by the spring suspension, the aerodynamic design of the transducer 21 and the rotational velocity of the disk. It is to be understood that FIG. 1 is representative of the minimum complement of parts used to establish the operational interface between the transducer 21 and the disk 10. In fact, a head-disk assembly normally makes provision for a plurality of parallelly spaced, coaxial disks which rotate on a common spindle together with a ganged array of transducer heads controlled by one or more actuator assemblies.

While the disk rotates, conventional means, not shown, are used to operate the transducer 21 to electromagnetically read signals from, or write signals to, the disk. For this purpose, the transducer includes a wound core with a recording gap. For an understanding of electromagnetic recording, see C. Denis Mee, et al., MAGNETIC RECORDING, McGraw-Hill, 1987.

FIG. 2 illustrates a typical prior art read/write head support structure. In the prior art, the structure in FIG. 2 includes what is commonly referred to as a "slider" 22, and the view is from the disk. The slider 22 is suspended on a gimbal 24, which allows the slider to be parallel to the disk 10 in response to forces applied to the slider in directions normal to the disk 10, while preventing lateral motion and yaw of the slider.

The slider 22 of FIG. 2 includes a pair of elongated rails 23, each with a flat bearing surface. A middle rail 25 is provided, also with a flat surface. The leading edges of the side rails 23 are beveled at 27, as is the leading edge of the center rail at 29. The transducer is mounted on the slider to place the recording gap 30 near the trailing edge of the center rail 25, while the transducer windings 32 are positioned below the recording gap on the trailing edge of the slider assembly beneath an anterior extrusion of the center rail 25. When the disk 10 rotates, a layer of air (the "air bearing") builds up at the interface between the slider of FIG. 2 and the disk 10. The built-up layer of air reverse loads the slider on the flat bearing surfaces of the rails 23, lifting the slider off of, or away from the disk 10. When the disk achieves its operational rotational velocity, the slider of FIG. 2 is borne on the counter-loading layer of air, which now functions as a bearing in supporting the slider during relative motion between it and the disk 10. When rotation of the disk expires, the flow of air between the slider and the disk ceases, removing the counter-loading force on the slider and permitting it to contact the surface of the disk 10.

In addition to the three-rail slider shown in FIG. 2 the art also encompasses other slider configurations, some of which eliminate the center rail and place the electromagnetic transducer element in one of the two laterally spaced slider rails 23.

Reference now to FIGS. 3-5C will provide an understanding of a fundamental aspect of the invention: a bearing composed of a non-Newtonian liquid. These figures are not to scale, and certain of their features have been exaggerated for clarity.

Figure 5A:
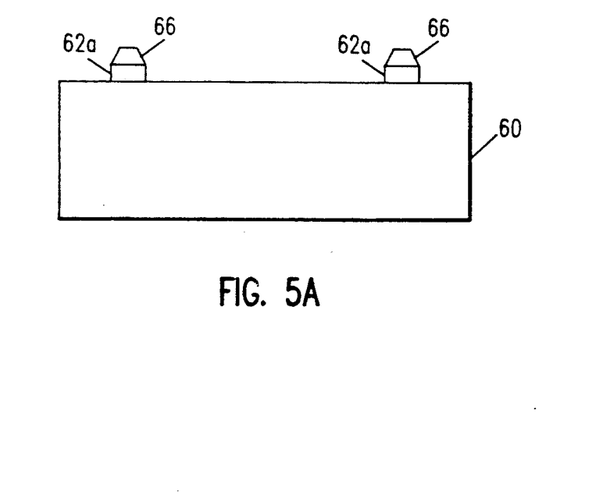
FIGS. 5A-5C illustrate enlarged front, bottom plan, and side views, respectively, of the head of FIG. 3.
Figure 5B:
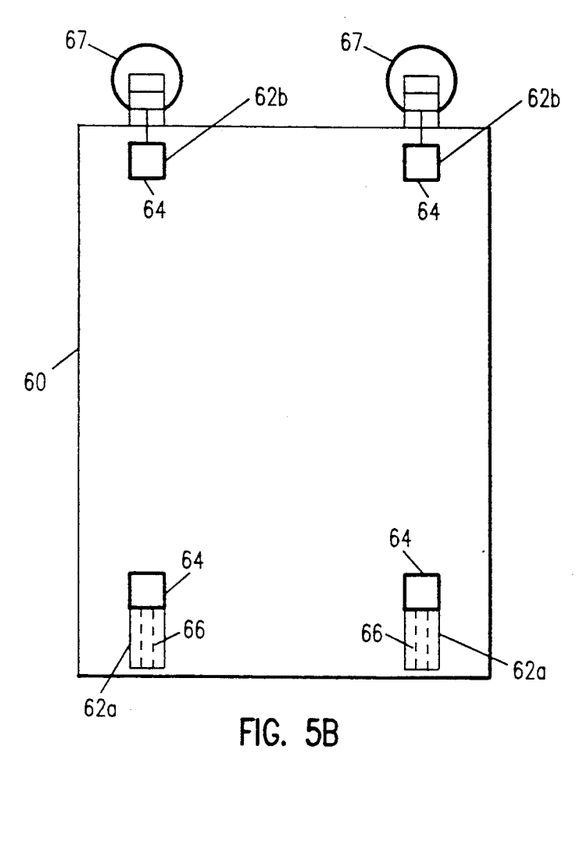
Figure 5C:
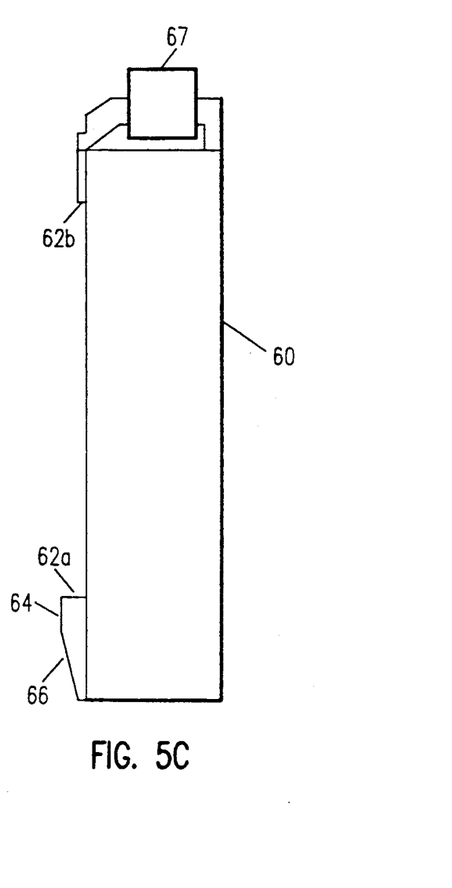

A recording head used with the invention includes a pair of transducers mounted on a slider block carried at the end of a spring mechanism which is attached to an actuator arm 52 by a pair of through-rivets 50. The rivets attach a flexible mounting strip 54 and a spring strip 56 to the arm in a manner which exerts a spring force through spring node 57 upon the mounting strip 54, which forces the mounting strip 54 toward the disk 10. A slider mechanism 60 including four slider pads 62 with flat bearing surfaces 64 is mounted at the trailing end of the mounting strip 54, suitably located underneath the spring node 57. As illustrated in FIG. 5, a pair of bearing pads 62a and 62b is carried on each side of the slider 60. Transducer coils 67 are mounted on the rear pads 62b on each side of the slider. A recording gap is formed in at least one of the pads 62b, which carry transducer coils 67. As seen most clearly in the front and side views, FIGS. 5A and 5C, each of the front bearing pads 62a has a forward beveled surface 66.

Figure 3:
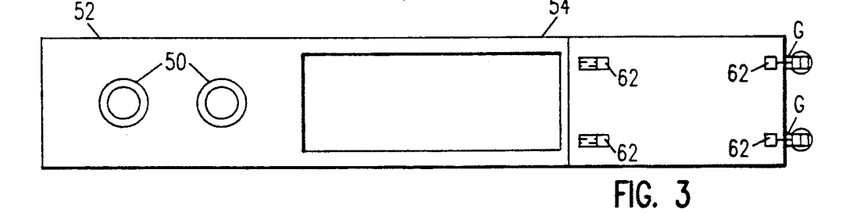
FIG. 3 illustrates and underside view of one embodiment of an improved head used with the present invention.

The edges of the 4 pads 62 shown on the head maybe slightly rounded or "blended" as is known in the art. The ramps shown on the front pads have a slope of 0.8° and are 15 mils long. All pads are 3 mils high. The head 60 is bonded to the mounting strip with epoxy. The flexure 54 is made from 3 mil thick stainless steel. This slider has heads on only the rear of both trailing pads. Only the outside head (closest the edge of the disk) was active in data taking, and disk speed was measured with respect to this head. The speeds measured were at the center of this outside pad. The gap is not located at the trailing edge of the pad, but 6 mils behind it in the middle of a 0.7 mil wide rail of ferrite (not shown) that extends a total of 10 mils behind the trailing edge of the pad.

Figure 4:
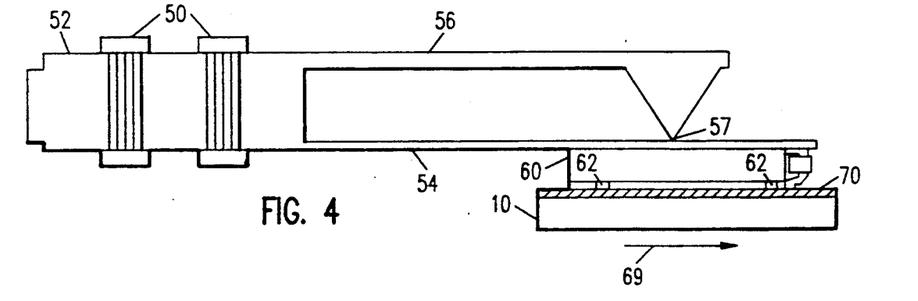
FIG. 4 illustrates a side sectional of the invention.

In FIG. 4, the disk 10 is rotated in the direction indicated by the arrow 69 to induce relative motion between itself and the slider 60. Carried on the surface of the disk 10 is a liquid 70 that forms the bearing which supports the slider in a spaced relationship with the upper surface of the disk 10. The slider 60 is loaded with a force or a pressure by the spring node 57, the force or pressure urging the slider in the direction of the disk 10. The liquid 70 is carried on the upper surface of the revolving disk 10. Directly underneath the pads of the slider 60, the liquid 70 has a thickness determined essentially by geometry of the pads, the magnitude and location of the force exerted by the spring 56, the speed of rotation of the disk 10, and the liquid's apparent viscosity. Thus, the spaced relationship exhibited by the slider 60 with respect to the disk 10 is determined by the force or pressure exerted on the slider by the spring 56 in cooperation with the counterforce exerted by the liquid bearing 70 on the slider.

Although not shown, means exist to continuously apply the liquid to the disk during its rotation. For example, a nozzle could be mounted to the slider, or by separate support, to irrigate the disk during rotation. Alternatively, the disk and slider (and associated components) could simply be immersed in the liquid during operation. A wicking arrangement for renewing the liquid bearing material is taught in U.S. patent application Ser. No. 07/314,999, which is incorporated herein by reference.

Relative to the gas bearing formed by air in the prior art recording systems, the liquid bearing 70 of FIG. 4 is non-compressible, thereby providing a very "stiff" bearing which stabilizes the slider with respect to the disk at head-to-disk spacings beneath the flying heights achievable with the prior art air bearing. Indeed, with an empirically selected combination of spring pressure, liquid viscosity, and disk speed, the thickness of the liquid bearing can be less than the mean free path of air molecules, the lower flying height limit of the air bearing in the prior art.

The viscosity of the liquid 70 (relative to air) also substantially increases the damping exhibited by the bearing, when compared to the damping evidenced by the air bearing. This tends to suppress or reduce oscillations of the slider which are perpendicular or parallel to the disk. As is known, perpendicular oscillations can cause the slider to strike the disk; parallel oscillations cause loss of track or phase errors in data being read or recorded, and affects settling time when the head is actuated from one track to another.

It is asserted that the inventive combination illustrated in FIG. 4 should not be limited to the particular slider configuration there illustrated. The inventors have also successfully employed the slider configuration illustrated in FIG. 2 in combination with the liquid bearing 70 to achieve a performance similar to that evidenced by the slider of FIGS. 3 and 5.

Figure 6:
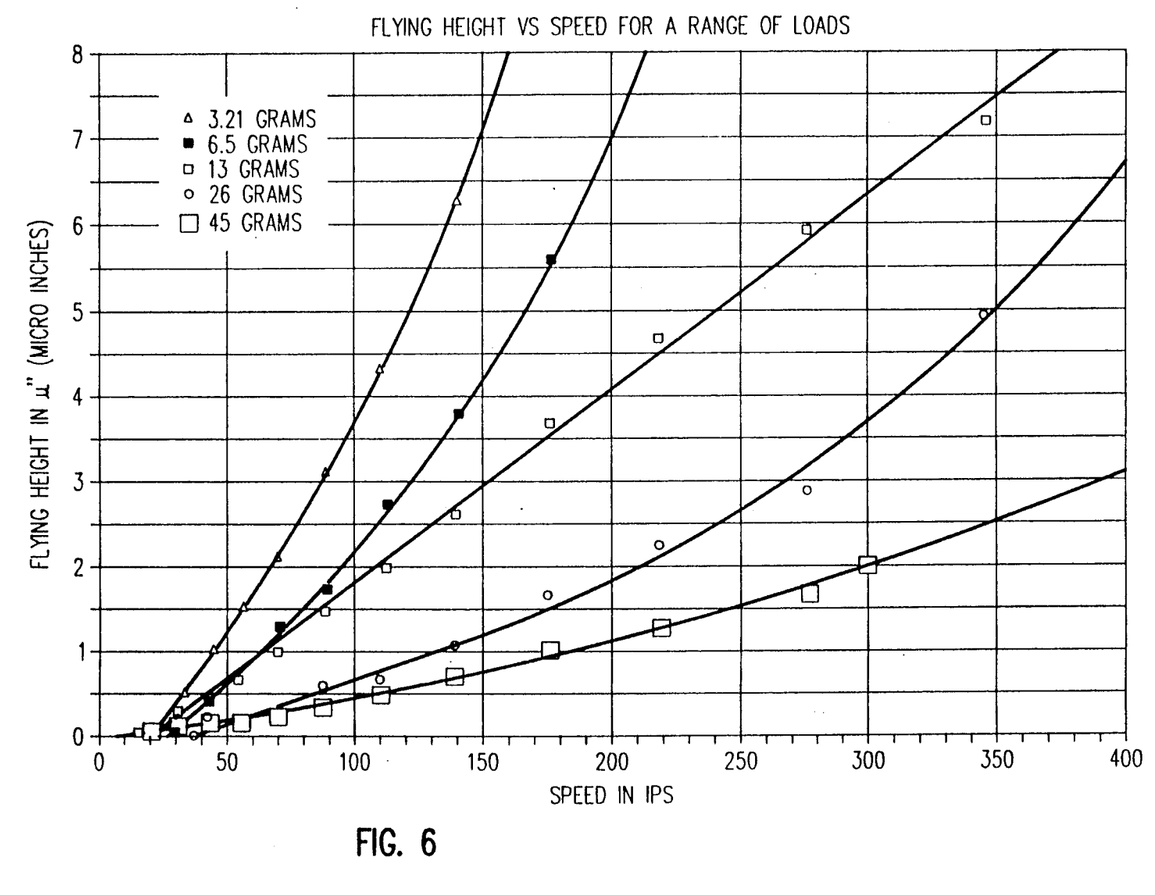
FIG. 6 is a graph which illustrates head-to-disk spacings achievable with this invention.

The performance of the inventive combination illustrated in FIG. 4 with the slider of FIGS. 3–5C is given in FIG. 6. FIG. 6 is derived from the data in Table I. FIG. 6 illustrates the head-to-disk spacing of the head as a function of speed in inches per second (ips) for various loading forces. The liquid used was GALDEN D02, made by Montefluous of Milan, Italy. "GALDEN" is a registered trademark of Montefluous.

According to principles well-known in the art, electrical measurement of the voltages generated by the head of FIG. 3 and 4 during playback under the various combinations of speed and load illustrated in Table 1 and FIG. 6 were used to infer the relative head-to-disk spacings of the head. The absolute head-to-disk spacings of this head were then measured by observing interference patterns of the surface of the slider while operating the slider above a glass disk under similar combinations of speed and load. FIG. 6 represents the inventors' best estimate of the flying height based on a comparison of the electrical and optical measurements. The head-to-disk spacings illustrated were further corroborated by noting that, as would be expected, they tend to converge on zero microinches as the speed approaches zero.

As stated above, the liquid used to form the bearing between the slider and disk is a non-Newtonian liquid. Under conditions encountered in the HDA operation of FIG. 4, the liquid is subjected to a very high shear rate at which its viscosity is highly non-linear. This provides a low-power interface at head-to-disk spacings that are significantly beneath the flying heights achievable in the prior art. Viscosity is defined as the proportionality constant between shear stress (F/A) and the velocity gradient. This relationship is symbolized by equation (1), wherein:

$$F/A = u \, dv/dy \quad (1)$$

Figure 7:
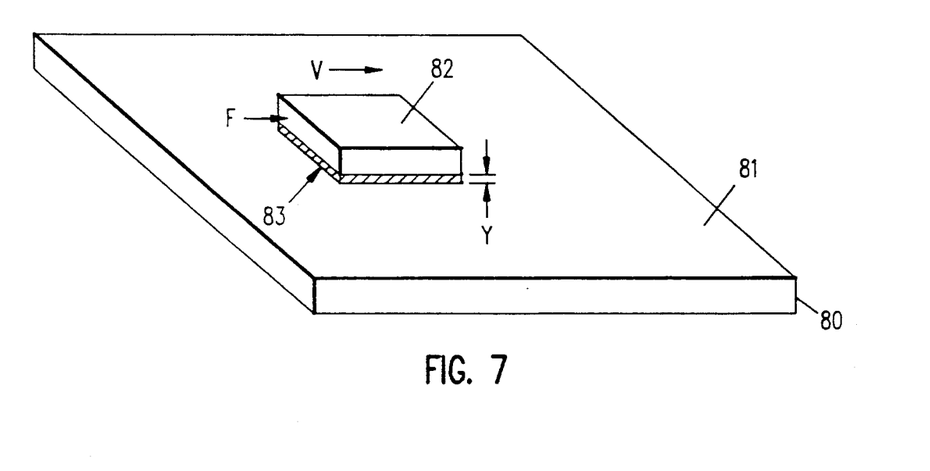
FIG. 7 provides a schematic illustration demonstrating parameters descriptive of a non-Newtonian liquid bearing.
Figure 8:
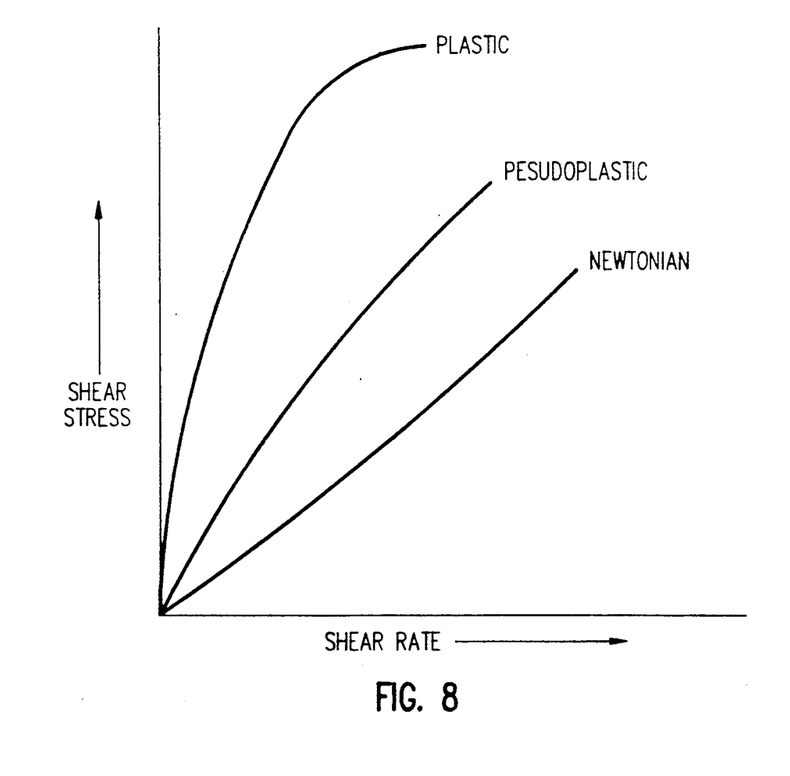
FIG. 8 is a set of curves demonstrating apparent viscosity of Newtonian fluids as compared with apparent viscosity of plastic or pseudoplastic fluids.

With reference to FIG. 7, and equation (1) F is the force exerted on a stationary plate 80 having an upper face 81 with an area A by a parallel plate 82 moving at a velocity v and spaced from the face 81 to a distance (i.e., head-to-disk spacing) y by a liquid 83 of viscosity u. For small y, the shear rate dv/dy is linear with y, and is v/y. When u is a constant, the liquid is said to be Newtonian, and the classical equation of hydrodynamics, the Navier-Stokes equation, is valid. The Navier-Stokes equation is not valid for any fluid that departs from constant u; in particular, the equation is not valid for fluids that depart so far from the constant as to be called "pseudoplastic" or "plastic". FIG. 8 illustrates the relationship of Newtonian and pseudoplastic and plastic liquids.

For definition and explanation of non-Newtonian fluid flow, reference is made to the CHEMICAL ENGINEER'S HANDBOOK, Fifth Edition, Robert H. Perry, et al., Editors, 1973, at pp. 5-38 through 5-40.

FIG. 8 illustrates the shear stress of a liquid as a function of time rate of deformation of the liquid (shear rate). As will be appreciated by those skilled in the art, when the arrangement of FIG. 7 is used to induce shear stress in the liquid 83, the time rate of deformation is directly related to the velocity, v. In FIG. 8, the shape of each curve directly represents the change in viscosity of the liquid. The curve labeled "Newtonian" shows a constant viscosity of a value corresponding to the slope of the curve. The curves labeled "pseudoplastic" and "plastic" indicate liquids whose viscosity apparently decreases with an increase in shear rate.

The degree to which the viscosity of a plastic or pseudoplastic liquid departs from a constant value under the drive conditions encountered by the liquid bearing of FIG. 4, for example, was quantified by the inventors by measuring the drag force on a head-to-disk spacing of two microinches ($5 \times 10^{-6}$ cm) and at a speed of 235 inches per second (597 cm/sec) and comparing that force with the drag force at low shear rate where the liquid has a relatively constant viscosity. The plastic or pseudoplastic nature of the liquid bearing is important to our invention since it allows very small power dissipation in the head-disk interface at the speeds and small spacings necessary for a very high density of information storage on the disk. In this regard, the power dissipated at the interface between the head and disk is given by equation (2), wherein:

$$P = Fv. \quad (2)$$

From equations (1) and (2), it is possible to calculate the drag force on a head, and the power dissipated in rotating a disk when the liquid bearing material is a Newtonian fluid. In an experiment conducted to measure non-linearity of shear stress, a liquid with a viscosity at a low shear rate of 1.8 centistokes was used. The velocity at high shear rate was 597 cm/sec and the head-disk spacing was $5 \times 10^{-6}$ cm. A 4-pad head, similar to the head illustrated in FIGS. 5A, 5B, and 5C was used, with the area of each pad being $8 \times 10^{-3}$ cm². The drag force on the head and the power dissipated in shearing liquid under these conditions, assuming the fluid to be Newtonian, would be:

$$F = Auv/y = 1.69 \times 10^4 \, dynes$$

and $$P = Fv = 1 \times 10^7 \, dyne \, cm/sec = 1.0 \, watts.$$

The actual force and power measured were $0.13 \times 10^4$ dynes and 0.078 watts. In comparing this value with the 1.0 watt value calculated for the Newtonian fluid, it is evident that the force and power necessary for a non-Newtonian plastic or pseudoplastic liquid are over an order of magnitude less than required with a Newtonian liquid. This departure from linearity is due to the non-Newtonian nature of the liquid used, and is so large that the liquid falls under the definition of plastic. Thus, the plastic liquid has been forced into a state where its dynamical viscosity is about 1/10 that of water, which unexpectedly results in the very low power required to rotate a disk when a recording head is supported by the liquid at a very low spacing with respect to the disk.

The measurement of force and power in the experiment described above was made using the GALDEN D02 liquid described above, which is in a family of perfluorinated liquids produced by Montefluos. The general chemical structure and characteristics of these liquids are known. Another liquid exhibiting properties of the curve labeled "plastic" in FIG. 9 is any one of a series of fluorinated oils produced by DuPont and sold under the trademark "KRYTOX". These materials are described as low molecular weight, fluorine end-capped, homopolymers of hexafluoropropylene epoxide with known chemical structure. These liquids are sometimes referred to as PFAE or PFPE oils. Generally, these materials can also be termed "liquid fluorocarbons".

At the very high shear rates experienced between the liquid bearing of this invention and a slider, the liquid becomes ordered in the sense that its molecules become aligned in the direction of shear, with the viscosity of liquid dropping in the direction of shear. This results in very little power loss in the interface with the concomitant advantage of requiring relatively low head loading force to achieve a desired head-to-disk spacing. At the same time, the viscosity perpendicular to the shear in the plane of the head-liquid bearing interface goes up, preventing leakage of the liquid out the sides of the head pads and an associated loss of head pressure that supports the head in its spaced flying height relationship with respect to the disk. The result is that very narrow head pads can be used, thereby further lowering head drag for a given flying height.

A further advantage lies in the relative insensitivity of the spacing of a head from a disk as a function of head-disk velocity. In this regard, disk drives prior art suffer from flying height that vary with the radial position of the head with respect to the center of the disk. In the prior art, this drawback is accommodated by limiting recording density to the worst case, that is, the highest flying height. In our invention, since spacing is related to viscosity and velocity as $G(uv)^{0.5}$ amd since $u = f(1/v)$, viscosity and velocity tend to compensate; in fact, if the slope of the non-Newtonian viscosity curve is selected properly, the two parameters of viscosity and velocity can effectively cancel each other, resulting in constant head-to-disk spacing independent of radial location of the head.

TABLE I

HEAD-TO-DISK SPACING (IN MICROINCHES) VERSUS SPEED FOR VARIOUS LOADS USING NON-NEWTONIAN LIQUID BEARING

| SPEED ips | FH @ 3.21 gr | FH @ 6.5 gr | FH @ 26 gr | FH @ 13 gr | FH2 45 gr |
|---|---|---|---|---|---|
| 347 | | | 4.9 | 7.3 | 2.0 |
| 276 | | | 2.9 | 5.9 | 1.6 |
| 219 | | | 2.3 | 4.6 | 1.3 |
| 174 | | 5.6 | 1.6 | 3.6 | 1.0 |
| 138 | 6.3 | 3.8 | 1.1 | 2.6 | 0.7 |
| 110 | 4.3 | 2.7 | 0.7 | 2.0 | 0.6 |
| 87 | 3.1 | 1.8 | 0.6 | 1.5 | 0.4 |
| 69 | 2.1 | 1.3 | 0.3 | 1.0 | 0.3 |
| 55 | 1.5 | 0.8 | 0.3 | 0.8 | 0.3 |
| 43 | 1.0 | 0.5 | 0.2 | 0.6 | 0.2 |
| 35 | 0.5 | 0.2 | | 0.3 | 0.2 |
| 28 | 0.3 | | | 0.3 | 0.1 |
| 22 | | | | 0.2 | |

While we have described several preferred embodiments of our liquid bearing, it should be understood that modifications and adaptations thereof will occur to persons skilled in the art. Therefore, the protection afforded our invention should only be limited in accordance with the scope of the following claims.

We claim:

1. An information storage system comprising:
   a substantially rigid, moveable storage medium;
   means for inducing movement of said storage medium for information transfer;
   a transducer means for being supported in a spaced relationship with said storage medium in response to said movement of said medium in order to provide information for storage on said storage medium or to receive stored information from said storage medium;
   loading means for exerting a loading force on said transducer means, which is directed toward said storage medium; and
   a non-Newtonian liquid bearing means between said storage medium and said transducer means and cooperating with said loading means for supporting said transducer means in said spaced relationship during said movement of said storage medium.

2. An information recording system, including:
   a rigid storage medium;
   means for inducing rotation of said storage medium;
   a transducer means for being positioned in a spaced relationship with said storage medium in response to said rotation to provide information for storage on said storage medium or to receive stored information from said storage medium;
   load means for exerting a positioning force on said transducer means which is directed toward said storage medium; and
   a plastic or pseudoplastic liquid spacing means between said storage medium and said transducer means and cooperating with said positioning means for supporting said transducer means in said spaced relationship in response to said rotation.

3. An information storage system comprising:
   a rigid storage medium for recording information signals;
   transducer means closely spaced from said storage medium for transducing information signals to be stored on and read out from said storage medium;
   load means for providing a load force to said transducer means, said load force being directed toward said storage medium;
   means for moving said storage medium with respect to said transducer means; and
   non-Newtonian fluid means disposed between and contacting said storage medium and said transducer means for providing hydrodynamic force opposing said load force so that said transducer means is spaced from said storage medium at a distance of less than 6.0 microinches.

4. The information storage system of claim 3, wherein said non-Newtonian fluid means includes a pseudoplastic fluid.

5. The information storage system of claim 3, wherein said non-Newtonian fluid means includes a plastic liquid in which the apparent viscosity of the liquid decreases with the shear rate to which the plastic liquid is subjected, the shear rate being determined by v/y, where v is the velocity of the storage medium with respect to the transducer means and y is the distance between said transducer means and said storage medium.

6. The information storage system of claim 3, wherein said non-Newtonian fluid means includes a liquid whose apparent viscosity decreases with an increase in the shear rate to which the liquid is subjected, the shear rate being determined by v/y, where v is the velocity of the storage medium with respect to the transducer means and y is the distance between said transducer means and said storage medium.

7. A information recording system, including:
a rigid disk;
means for inducing rotation of said rigid disk;
a transducer carrier for being supported in a closely spaced relationship with said rigid disk for information exchange therewith in response to said rotation;
means for exerting a positioning force on said transducer carrier, the positioning force being directed toward the rigid disk; and
a non-Newtonian liquid between the transducer carrier and the rigid disk for supporting the transducer carrier at a distance of between 6.0 and 0.5 microinches from the rigid disk.

8. The information recording system of claim 7, wherein the non-Newtonian liquid is a plastic liquid.

9. The information recording system of claim 7, wherein the non-Newtonian liquid is a pseudoplastic liquid.

10. The information recording system of claim 7, wherein the non-Newtonian liquid is a member of the group containing perfluoropolymers, perfluoropolyethers, and oxirametrifluoro-homopolymers.

11. The information recording system of claim 7, wherein the non-Newtonian liquid is a liquid fluorocarbon.

12. A disk drive system, comprising:
a rigid disk having a major surface;
means for transferring data from said major surface, said means for transferring including a transducer supported in a closely spaced relationship with respect to said major surface, said means for transferring having a support surface;
means for inducing rotation of said disk; and
a liquid bearing material provided in a thin layer on said major surface for supporting said means for transferring in said closely spaced relationship in response to said rotation, said closely spaced relationship being a distance substantially perpendicular to said major surface and between said support surface and said major surface of less than about 6 microinches.

13. The disk drive system of claim 12, wherein said liquid bearing material is a non-Newtonian liquid bearing material.

14. The disk drive system of claim 12, wherein said liquid bearing material has a viscosity, said viscosity being non-linear in response to said rotation.

15. An information recording system, including:
a rigid Winchester-type disk with a recording surface;
a transducer carrier for being supported in a closely spaced relationship with said recording surface;
a transducer mounted to said transducer carrier for information transfer with said recording surface;
means for rotating said rigid disk for said information transfer; and
a relatively thin layer of liquid bearing material on the rigid disk for supporting the transducer carrier at a distance of about 6 microinches, or less, with respect to said recording surface when said rigid disk is rotating.

16. The information recording system of claim 15, wherein said liquid bearing material is a non-Newtonian liquid bearing material.

17. The information recording system of claim 16, wherein said non-Newtonian liquid bearing material is a plastic material or a pseudoplastic material.

18. The information recording system of claim 15, further including:
means for exerting a positioning force on said transducer carrier;
said positioning force being directed substantially toward said recording surface; and
said positioning force being in a range between about 3 grams and about 45 grams.

19. The information recording system of claim 18, said liquid bearing material including a non-Newtonian liquid.

* * * * *